United States Patent
Singh et al.

(10) Patent No.: US 8,677,493 B2
(45) Date of Patent: Mar. 18, 2014

(54) DYNAMIC CLEANING FOR MALWARE USING CLOUD TECHNOLOGY

(75) Inventors: Prabhat Kumar Singh, Bangalore (IN); Palasamudram Ramagopal Prashanth, Bangalore (IN); Nitin Jyoti, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/227,407

(22) Filed: Sep. 7, 2011

(65) Prior Publication Data

US 2013/0061325 A1    Mar. 7, 2013

(51) Int. Cl.
   *G08B 23/00* (2006.01)
(52) U.S. Cl.
   USPC .......................................................... 726/24
(58) Field of Classification Search
   USPC .......................................................... 726/24
   See application file for complete search history.

(56) References Cited

U.S. PATENT DOCUMENTS 6,622,150 B1    9/2003  Kouznetsov et al.
8,291,496 B2 *  10/2012 Bennett ........................... 726/23
2002/0116639 A1  8/2002  Chefalas et al.
2006/0130141 A1 * 6/2006  Kramer et al. .................. 726/23
2007/0143843 A1  6/2007  Nason et al.
2011/0209220 A1  8/2011  Tikkanen et al.

OTHER PUBLICATIONS

International Search Report and Written Opinion of the International Searching Authority dated Dec. 27, 2012 in matter No. 290-0177WO, International Application No. PCT/US2012/053995.

* cited by examiner

*Primary Examiner* — Kambiz Zand
*Assistant Examiner* — Abiy Getachew
(74) *Attorney, Agent, or Firm* — Wong, Cabello, Lutsch, Rutherford & Brucculeri, LLP

(57) ABSTRACT

A method for providing malware cleaning includes detecting potential malware on a first device connected to a network. A request including information to allow a second device connected to the network to determine an appropriate cleaning response is sent from the first device to the second device over the network. Upon receiving the request, the second device attempts to identify an appropriate cleaning response and, if a response is identified, sends the cleaning response over the network to the first device. The cleaning response is usable by the first device to address the detected potential malware.

16 Claims, 5 Drawing Sheets

DYNAMIC CLEANING FOR MALWARE USING CLOUD TECHNOLOGY

BACKGROUND

This disclosure relates generally to the field of computer security. More particularly, but not by way of limitation, it relates to the provision of cleaning code to remove malware and its effects from a device in close temporal proximity to the detection of the malware on the device.

Malware is a broad term used to describe malicious software that infects computer systems and can have varying degrees of effects. For example, the effects of malware can range from irritating and unwanted adware and spyware to computer viruses, worms, and Trojan horses that can render a computer system virtually useless. With the vast number of devices connected to networks such as the Internet and the expansion of high speed connections to these networks, malware threats can spread from system to system extremely rapidly. It is therefore common practice to employ some type of antivirus application (the term antivirus referring to a wide variety of malware) on these devices to detect malware on the device, and, if necessary, perform desired cleaning functions to remove the malware and repair its effects.

Because malware creators continuously introduce new and unique forms of malware, antivirus applications must be updated regularly to include techniques capable of detecting and repairing the most recently introduced malware threats. Accordingly, antivirus software providers routinely distribute definition files as updates to their antivirus applications. These definition files typically consist of signature files, representative of known malware to which system files can be compared for the detection of malware, and cleaning code to remove the known malware and repair its effects if detected. Even with these updates, however, it is possible for malware threats to infect large numbers of computer systems before new definition files are made available as part of an update.

Antivirus software providers have therefore employed cloud technology to detect malware. Cloud technology allows for the provisioning of services and data from a remote location via a network connection to a local device. In the case of malware detection using antivirus software, for example, information about a suspicious system file which cannot be identified as malware based on the definition files installed on the device may be packaged and transmitted utilizing cloud technology to a network device associated with the antivirus software provider via an Internet connection for further inspection. The network device can evaluate the provided information and respond with an indication that the file is or is not malware. It is therefore possible to detect malware using cloud technology even where updated definition files containing a signature of the malware have not been provided as part of a software update. However, in response to a detection of malware using cloud technology, only the most generic remedial measures to address the malware are available. For example, a default remedial measure to address detected malware for which there is no specific cleaning code may be to simply delete a suspect file. Such measures often fail to fully address the threat, and, therefore, a user of the antivirus software is left to wait for the next software update containing the proper cleaning code to address the detected malware.

An antivirus application may not have the appropriate cleaning code even where malware is detected using the antivirus application installed on the local device. For example, an antivirus application may include heuristic detection techniques according to which the software may detect malware not by comparing a system file to a signature of known malware but rather by evaluating a system file to detect properties that resemble malware. Using this type of detection, antivirus software is capable of detecting malware without the use of a signature representing the particular malware. Because this technique detects malware not by recognizing a file as a specific known malware but rather by recognizing the file as consistent with general properties of malware, it is possible that no specific cleaning code will be available as part of the definition files to address the detected malware. Here again, a user may be left to wait for the next software update containing the proper cleaning code to address the detected malware.

There is thus a need to address these and other issues associated with the prior art.

SUMMARY

In a first embodiment, a method for providing malware cleaning includes detecting potential malware on a first device connected to a network, sending a request from the first device to a second device over the network, the request including information to allow the second device to determine an appropriate cleaning response, and receiving the cleaning response over the network from the second device at the first device, the cleaning response usable by the first device to remove the detected potential malware.

In a second embodiment, a computer program product includes computer instructions to perform the method of the first embodiment.

In a third embodiment, a system includes a client and a server. The client includes a storage device and a processor operatively coupled to the storage device, the processor adapted to execute program code stored in the storage device to detect potential malware and send a request containing information pertaining to the detected potential malware over a network. The server includes a storage device and a processor operatively coupled to the storage device, the processor adapted to execute program code stored in the storage device to receive the request from the client over the network, determine a cleaning response, and send the cleaning response to the client over the network, the cleaning response usable by the client to remove the detected potential malware.

In a fourth embodiment a method for providing malware cleaning includes receiving a malware cleaning request from a first device over a network at a second device, identifying a malware definition portion of the malware cleaning request, searching a data store of the second device for a record matching the identified malware definition portion, and sending a cleaning response from the second device to the first device over the network, the cleaning response determined from the record.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1:
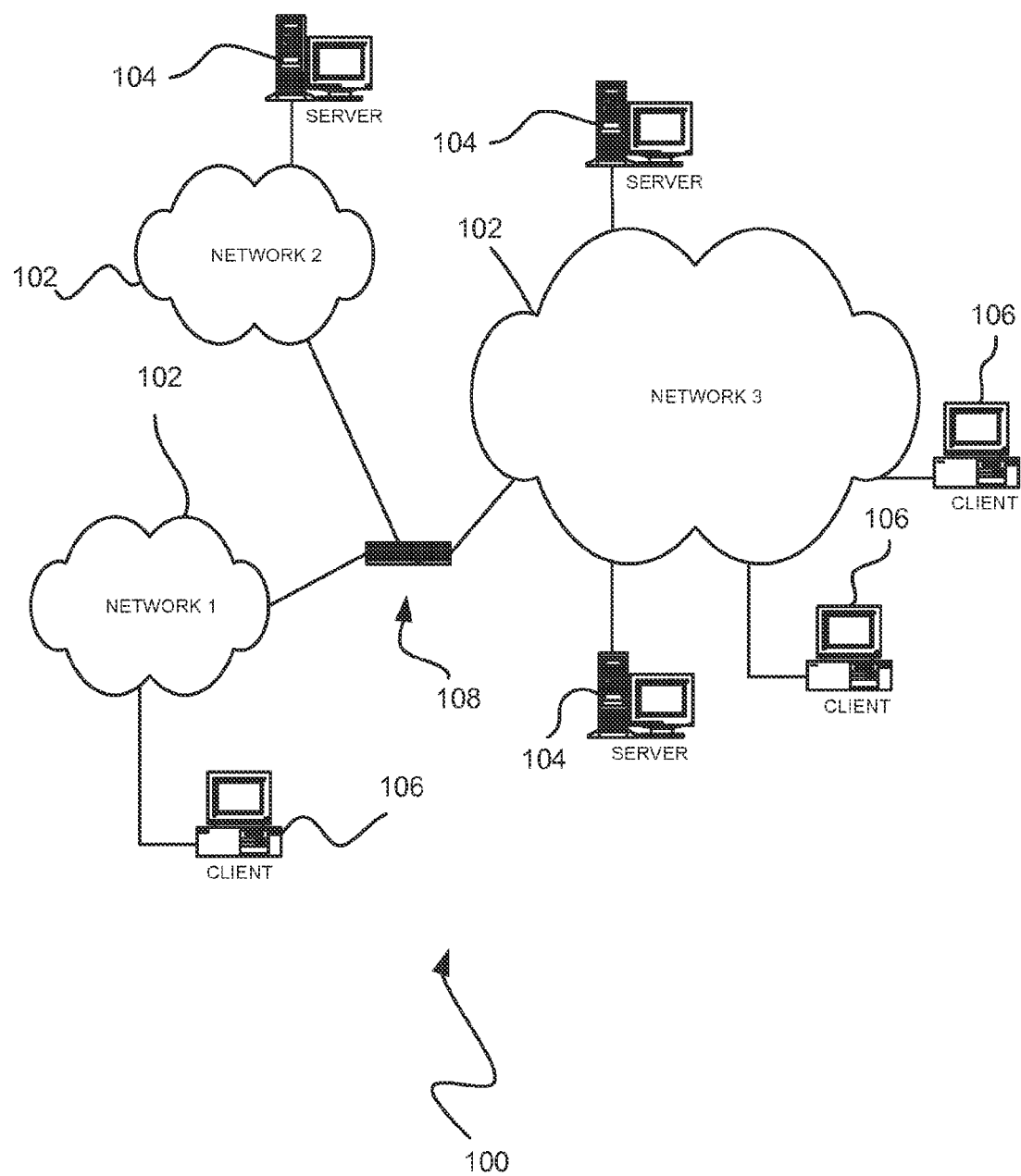
FIG. 1 is a block diagram illustrating a network architecture according to one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 and clients 106 which are capable of communicating over the networks 102. Such servers 104 and/or clients 106 may each include a desktop computer, laptop computer, hand-held computer, mobile phone, personal digital assistant (PDA), peripheral (e.g. printer, etc.), any component of a computer, and/or any other type of device capable of communicating over a network 102. At least one gateway 108 is optionally coupled between the networks 102 such that each of the servers 104 and clients 106 connected to a particular network 102 may be capable of communicating with a server 104 and/or client 106 connected to a different network 102.

Figure 2:
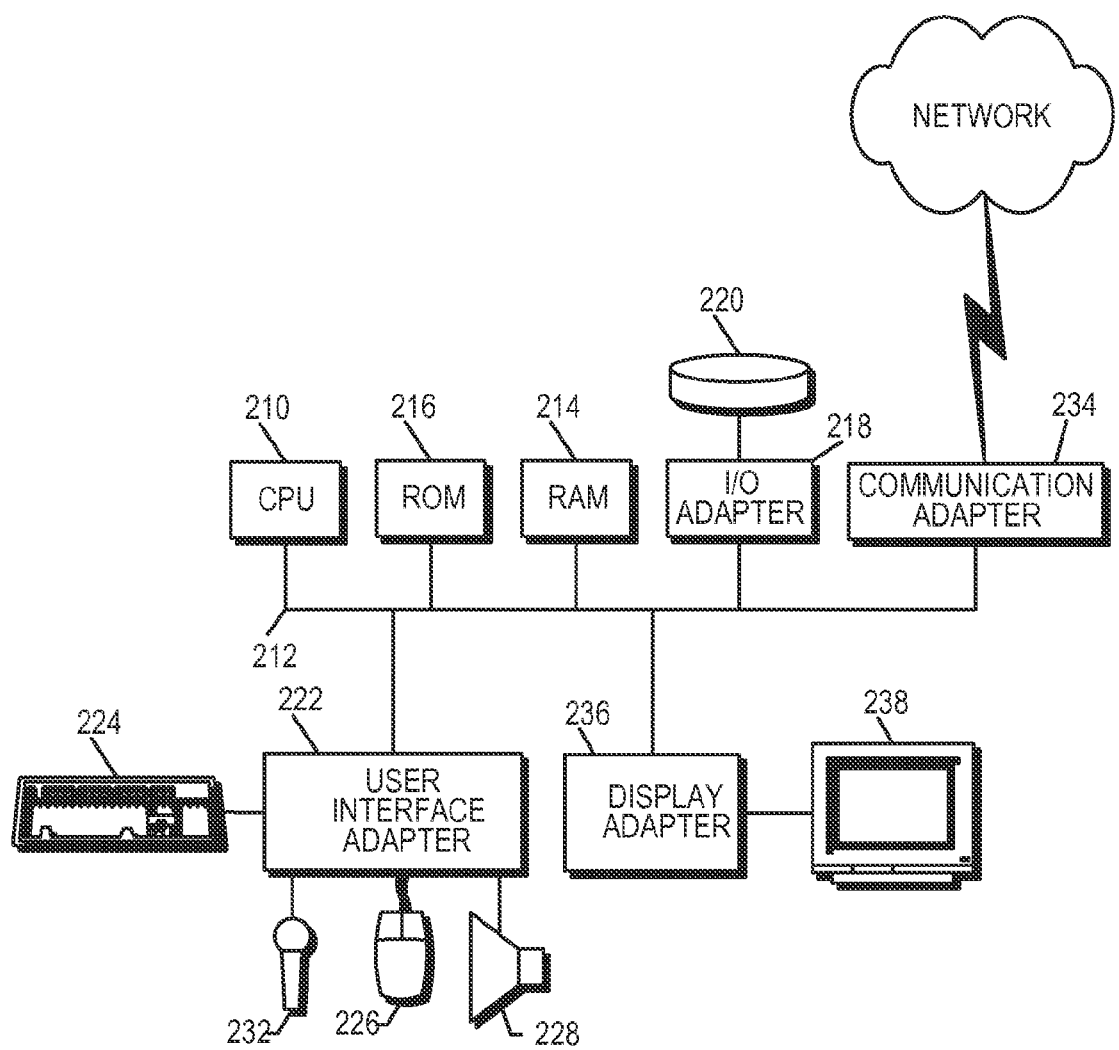
FIG. 2 is a block diagram illustrating a representative hardware environment according to one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, a communication adapter 234 for connecting the workstation to a communication network, such as, for example, any of networks 102 of FIG. 1, and a display adapter 236 for connecting the bus 212 to a display device 238.

The workstation may have resident thereon any desired operating system. An embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

The various embodiments set forth herein may be implemented utilizing hardware, software, or any desired combination thereof. Any type of logic may be utilized which is capable of implementing the various functionality set forth herein.

Figure 3:
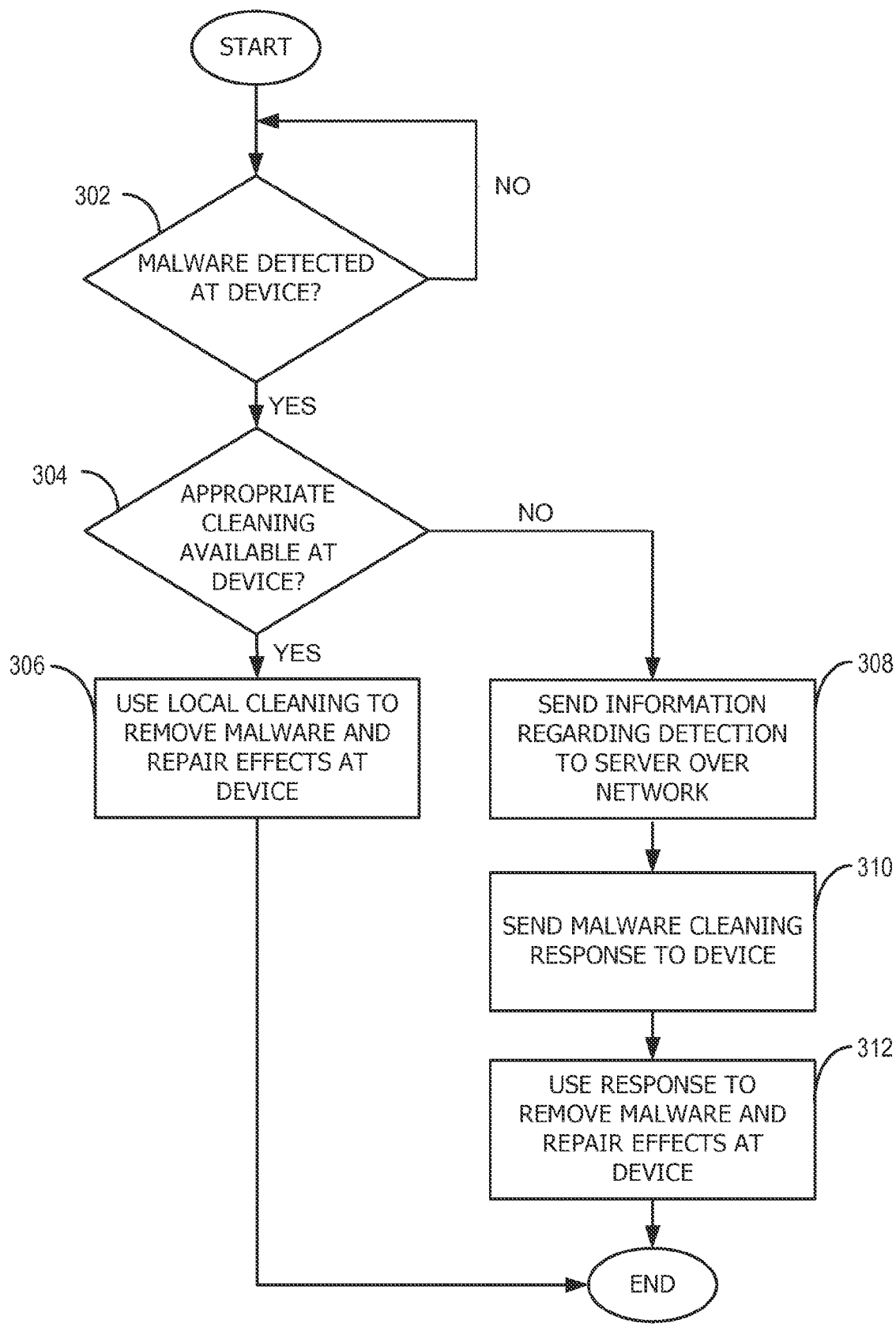
FIG. 3 is a flowchart illustrating a process for providing dynamic malware cleaning using cloud technology according to one embodiment.

Referring to FIG. 3, in an example embodiment, a process for providing dynamic malware cleaning using cloud technology is depicted. For purposes of clarity, the act of malware cleaning refers to any act including but not limited to those seeking to remove, render ineffective, quarantine (i.e. isolate in a single area of a system to prevent the spread of harmful effects to other areas of the system), and/or repair the effects of any type of malicious software. In the illustrated embodiment, providing dynamic malware cleaning begins with the process of detecting malware on a device. The device might be any device capable of being affected by malware such as, for example, any of the devices described above in FIG. 1. Malware may be detected on the device using any desired technique capable of detecting malware. The process of detecting malware on a device may include comparing a file of the device to known malware signatures stored on the device. Alternatively, the process of detecting malware may include packaging and transmitting information regarding a suspect file on the device to a network device for a determination regarding whether the file is malware. Malware may also be detected on the device using heuristic or behavioral based detection techniques. If no malware is detected at step 302, the process of attempting to detect malware on the device continues. For example, searching for malware may be performed continuously or in response to certain occurrences on the device as will be described below.

If, however, malware is detected at step 302, whether appropriate cleaning procedures for the detected malware are available on the device is determined at step 304. In one embodiment, an antivirus application responsible for detecting the malware may determine whether cleaning code is available as part of the antivirus application for the specific malware detected. In one embodiment, appropriate cleaning procedures may not be available at the device if cleaning procedures for the specific malware detected are unavailable, outdated, or unlikely to provide satisfactory results. If appropriate cleaning procedures are available at the device, the locally available cleaning procedures are utilized to remove the detected malware and repair the effects of the malware at 306. In one embodiment, using the locally available cleaning procedures to remove the detected malware and repair its effects 306 may include executing program code that is part of an antivirus application installed on the device. Using locally available cleaning procedures to repair malware and remove its effects may be performed in any desired manner.

If appropriate cleaning procedures are not available at the device, information regarding the detected malware may be sent to a server at 308 over a communication network using a network connection of the device. In one embodiment, the server may be accessible to the device by means of an Internet connection. However, the server may be accessible to the device by any desirable network connection such as those discussed above in FIG. 1. In one embodiment, the server may be a server affiliated with a provider of an antivirus application installed on the device. While the receiving device is described as a server, it will be understood that the receiving device may be any network device capable of receiving the information sent from the device and processing the information accordingly. In one embodiment, there may be multiple servers capable of receiving information regarding the detection of malware from a device. The appropriate server may be determined according to the type of malware detected, the location of the device, etc. The server, therefore, may be any network device capable of receiving the information and providing an appropriate response to the device.

In one embodiment, the information sent to the server may include a hash of a file identified as the detected malware. In one embodiment, the information sent to the server may be encrypted. The information may be encrypted using private-key cryptography (i.e. symmetric cryptography) or public-key cryptography (i.e. asymmetric cryptography). However, the information sent to the server may include any information capable of allowing the server to identify an appropriate cleaning response associated with the detected malware. For example, in one embodiment the information may be used by the server to perform a database lookup cross-referencing specific types of malware to corresponding cleaning responses.

In response to the receipt of information regarding the detected malware, the server may respond with the appropriate cleaning response at 310. As will be described in greater detail below, in various embodiments the response provided by the server may include instructions to reference cleaning code already existing on the device, for example as part of an antivirus application installed on the device, cleaning routines to be executed by the device, a combination of instructions referencing existing cleaning code on the device and cleaning routines to be executed by the device, or instructions to obtain a cleaning response from a different network device. However, the response may include any content capable of allowing the device to remove the detected malware and repair its effects. At step 312, the device may utilize the response to remove the detected malware and repair its effects.

Figure 4:
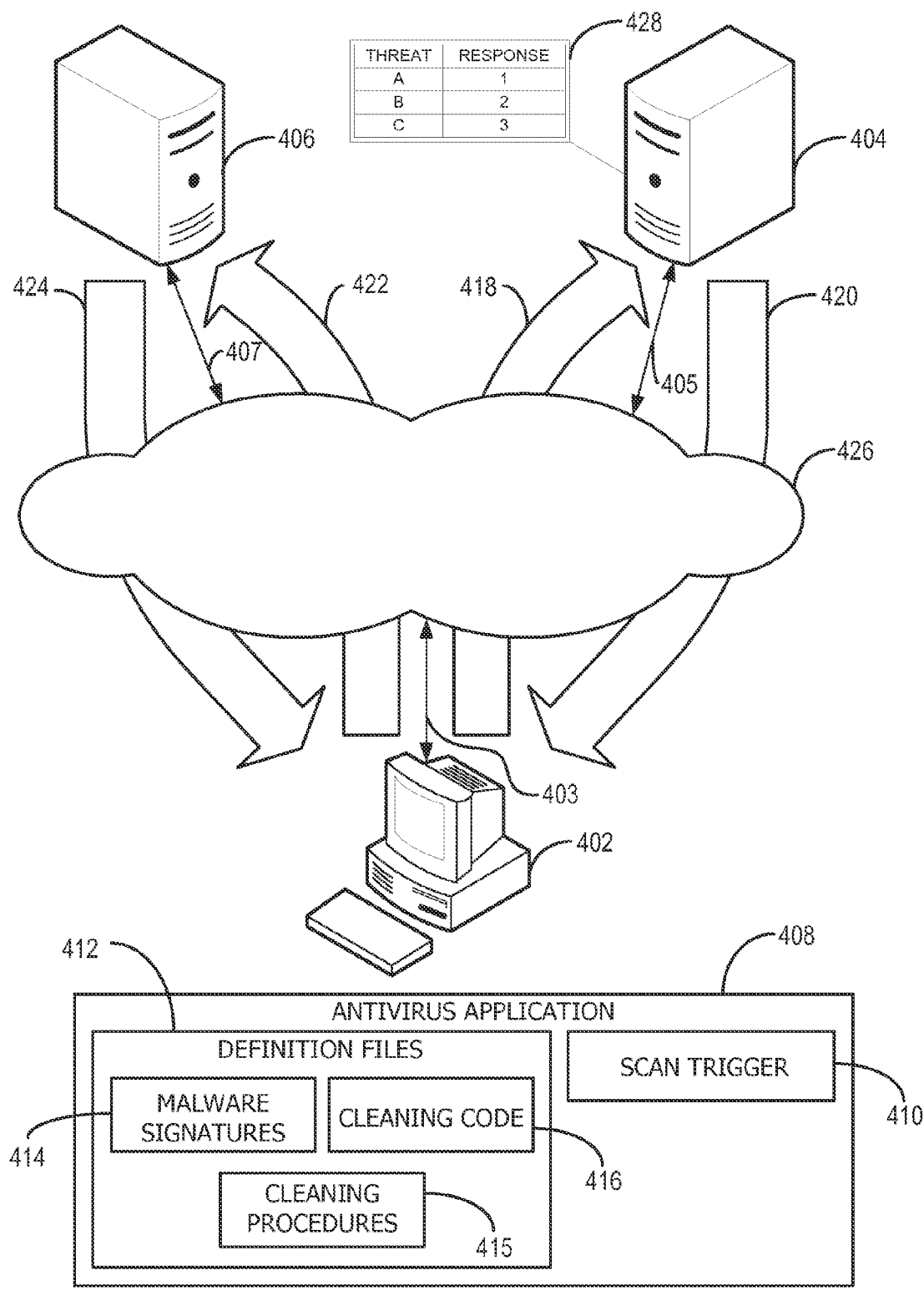
FIG. 4 is a block diagram illustrating a network architecture for providing dynamic malware cleaning using cloud technology according to one embodiment.

Referring to FIG. 4, in an example embodiment, a network architecture for providing dynamic malware cleaning includes a workstation 402 that has installed thereon an antivirus application 408. The workstation 402 is connected to a network 426 by means of network connection 403. The workstation 402 is depicted as a personal computer but could be any device capable of being affected by malware such as any of the devices discussed above in FIG. 1. In one embodiment, workstation 402 may actually be a virtual machine (i.e., a software implementation of a machine) upon which the antivirus application 408 is being executed.

In one embodiment, the antivirus application 408 might be utilized by the workstation 402 to protect the workstation 402 from malware threats. Antivirus application 408 may be configured to address any type of malicious software created to disrupt the normal and intended operation of the workstation 402. Such malware threats may include but are not limited to computer viruses, worms, Trojan horses, spyware, adware, scam software, etc. The antivirus application 408, for example, might detect malware present on the workstation 402 and take necessary actions to remove, render ineffective, quarantine, etc. the detected malware.

In one embodiment, the antivirus application 408 may contain a scan trigger 410 and definition files 412. It will be understood by one of ordinary skill in the art that the depiction of the content of antivirus application 408 is utilized here to reference certain objects to describe an embodiment of the disclosure rather than to provide an exhaustive inventory of the contents of antivirus application 408.

Scan trigger 410 may include computer code for causing the antivirus application 408 to initiate the evaluation of a particular file, file directory, etc. of workstation 402. Scan trigger 410 may be activated based on the occurrence of various events on workstation 402. For example, in one embodiment scan trigger 410 may initiate an evaluation of a file in response to a user attempting to access the file. In another embodiment scan trigger 410 may initiate an evaluation of a file or file directory according to a regular schedule of the antivirus application 408. For example, the scan trigger 410 may trigger the evaluation of a particular file or file directory based on a regularly scheduled interval.

Definition files 412 may contain malware signatures 414, cleaning procedures 415, and cleaning code 416. Malware signatures 414 may include representative patterns of code of known malware or other data that can be used to identify the malware. At the initiation of scan trigger 410, a particular file may be scanned using malware signatures 414 to determine if any code in the file matches any of the malware signatures 414 of known malware. The definition files 412 may additionally contain cleaning code 416 that facilitates the removal of detected malware and the repair of any effects of the malware. In one embodiment, cleaning code 416 may contain a library of routines utilized to remove malware and/or mitigate its effects. Antivirus application 408 may utilize cleaning procedures 415 to initiate the appropriate routines of cleaning code 416. Cleaning procedures 415 may contain records relating specific malware to the appropriate cleaning routines of cleaning code 416 to be executed to address the malware. For example, upon the identification of a particular malware threat, antivirus application 408 may consult cleaning procedures 415 to initiate the execution of certain routines of cleaning code 416 specifically known to combat the particular malware threat that was detected. If a different malware threat is detected, cleaning procedures 415 may call for the execution of different routines of cleaning code 416. In one embodiment, software updates may be routinely made available by a provider of the antivirus application 408 in order to update definition files 412 to include malware signatures 414, cleaning procedures 415, and cleaning code 416 for recently identified malware threats.

Antivirus application 408 may determine that cleaning procedures 415 for a particular detected malware threat are unavailable, outdated, or unlikely to provide satisfactory results. For example, in one embodiment, a malware detection may have been the result of detection using cloud technology. Using cloud technology, malware may be detected utilizing signatures that are stored at a remote network location such as a server rather than as part of malware signatures 414 of definition files 412. In one embodiment, the server may be server 404. Using this detection method, the local device 402 may provide information regarding a suspect file to the remote location over a network connection for evaluation. When malware is detected using cloud technology, however, because no malware signature 414 is present in definition files 412 for the specific malware detected, a record for the specific detected malware may not be available in the cleaning procedures 415 to indicate the cleaning code 416 to combat the detected malware.

In another embodiment, the malware detection may be based on a heuristic analysis of a particular file. Because heuristic analyses detect general patterns of malware rather than a specific type of malware, an entry for the specific malware detected utilizing the heuristic analysis may not be available in the cleaning procedures 415 to indicate the appropriate cleaning code 416 to combat the detected malware.

In yet another embodiment, the detected malware may be recognized as exhibiting sufficient characteristics of a particular malware such that it can be recognized utilizing a malware signature 414 of definition file 412. However, it may be determined that the detected malware, although having characteristics of the known malware upon which the malware signature is based, has unique properties not observed in the known malware. Accordingly, it may be determined that cleaning procedures 415 associated with the known malware upon which the malware signature 414 is based may not provide satisfactory results when applied to the detected malware. Consequently, the likelihood of providing improper cleaning for a detected malware may be reduced by using the cloud technology techniques disclosed herein.

In still another embodiment, definition file 412 may indicate that cleaning procedures 415 are outdated. For example, a software update containing definition files 412 may recognize that a particular malware threat for which there is included a malware signature 414 is so quickly evolving that corresponding cleaning procedures 415 should be used only after determining whether more suitable cleaning is available using cloud technology. Therefore, prior to utilizing the cleaning procedures 415 corresponding to the quickly evolving malware threat, antivirus application 408 may use cloud technology to determine if the cleaning procedures 415 are still appropriate. One of ordinary skill in the art will recognize that additional reasons may exist for determining that cleaning procedures 415 are unavailable, outdated, or unlikely to provide satisfactory results.

According to the embodiment depicted in FIG. 4, when antivirus application 408 determines that cleaning procedures 415 are unavailable, outdated, or unlikely to provide satisfactory results, antivirus application 408 may request malware cleaning using cloud technology. As is shown, workstation 402 is connected to a server 404 affiliated with a provider of antivirus application 408 by means of a network connection to network 426. Server 404 is connected to network 426 by means of network connection 405. Server 404 may be any device capable of responding to network requests from a plurality of workstations 402 and performing the functions described below. In one embodiment, network 426 may be the Internet. Network 426, however, may be any of the networks described above in FIG. 1. As is depicted, antivirus application 408 may prompt workstation 402 to issue a request for malware cleaning 418 from server 404 using network 426. In one embodiment, workstation 402 may issue a request such as a domain name system (DNS) query or hypertext transfer protocol (HTTP) request for malware cleaning. In another embodiment, workstation 402 may utilize a file transfer protocol (FTP) to upload data to server 404. Other types of requests may also be used as desired. In one embodiment, the request 418 may contain a hash of a file that has been detected as malware. In one embodiment, the request 418 may contain encrypted information. In one embodiment, the request 418 may include a key or other data such that server 404 may authenticate the request 418 as a legitimate request originating from a known antivirus application 408. In another embodiment, receipt of the request 418 may prompt the server to issue a request that a user of the workstation 402 enter a password in order to authenticate the request 418. The request for malware cleaning 418 can take any form capable of providing the necessary information to server 404 such that an appropriate malware cleaning response can be provided.

In response to receiving the request for malware cleaning 418, server 404 may evaluate the contents of the request to identify the detected malware and determine the appropriate response. In one embodiment, server 404 may consult a data store 428 (e.g., a library, database, or other means of data storage) associating specific malware threats with appropriate responses. In one embodiment, server 404 may decrypt the encrypted information provided by the workstation 402 and use the decrypted information to identify the detected malware and to determine the proper response based on relational information in data store 428. In one embodiment, server 404 may compare a hash of a suspect file sent as part of request 418 to a database of file hashes in data store 428 to determine the proper response. Server 404 may identify the detected malware and determine an appropriate response in any desirable manner.

After server 404 has identified the detected malware and determined an appropriate response, server 404 may issue a response 420 to workstation 402. In one embodiment, the response may be a response to a DNS query or HTTP request from workstation 402. In another embodiment, response 420 may utilize a file transfer protocol (e.g. FTP, TFTP, FTPS, etc.) to transfer data to workstation 402. In one embodiment, response 420 may be encrypted and must be decrypted by antivirus application 408. It will be understood by one of ordinary skill in the art that response 420 can be made in any desirable manner to communicate the appropriate information from server 404 to workstation 402 using network 426.

As will be described below, cleaning response 420 may take various forms. In certain embodiments, cleaning response 420 may contain cleaning instructions and/or cleaning routines. For purposes of clarity, cleaning instructions reference specific routines of existing cleaning code 416. Cleaning routines, on the other hand, are executable routines not included in cleaning code 416 but provided as part of response 420.

In one embodiment, response 420 may contain cleaning instructions. Such cleaning instructions, for example, may refer to routines of cleaning code 416 of definition files 412. While it may have been determined that cleaning procedures 415 associated with the detected malware were unavailable, outdated, or unlikely to provide satisfactory results, for example, because no cleaning procedures 415 record existed for the detected malware, it may be determined that the cleaning routines needed to address the detected malware do exist in cleaning code 416. Server 404, in response to request 418, may identify the detected malware and determine that the necessary cleaning code 416 is already available in definition files 412. For example, the appropriate response to the detected malware may be a new combination of existing routines. In one embodiment, workstation 404 may indicate the current version of definition files 412 as part of request 418 in order to allow server 404 to respond appropriately. Alternatively, server 404 may request the current version of definition files 412 from workstation 404 after receiving request 418 and prior to issuing response 420. Accordingly, response 420 may prompt antivirus application 408 to execute certain routines of cleaning code 416 indicated in the instructions to remove the detected malware and repair its effects.

In another embodiment, response 420 may contain cleaning routines to be executed by antivirus application 408. According to this embodiment, server 404, in response to request 418, may identify the detected malware and determine that the necessary cleaning routines are not available in cleaning code 416. Response 420, therefore, may provide the necessary cleaning routines, for example, as an executable file to be initiated by antivirus application 408 without reference to cleaning code 416. In one embodiment, if cleaning routines for the detected malware are available in a most recent version of cleaning code 416 but request 418 indicates that definition files 412 for workstation 402 are not up to date and therefore do not contain the proper cleaning routines, response 420 may contain the appropriate cleaning routines to be initiated by antivirus application 408. Alternatively, response 420 may provide cleaning instructions referencing cleaning routines in the most recent definition files 412 and prompt workstation 402 to acquire the most recent definition files 412 such that the cleaning routines referenced by the instructions can be executed.

In another embodiment, response 420 may contain cleaning routines as well as instructions to reference cleaning routines in cleaning code 416 of definition files 412. According to this embodiment, server 404, in response to request 418, may identify the detected malware and determine that some of the necessary cleaning routines are available in cleaning code 416 but that to fully address the specific malware detected, additional cleaning routines are required. Accordingly, response 420 may provide cleaning routines, for example, as an executable file in addition to instructions referencing cleaning routines of cleaning code 416.

In still another embodiment, response 420 may delegate any of the responses described above to server 406. For that matter, response 420 may delegate any desirable response to server 406. Server 406 is connected to network 426 by means of network connection 407. Response 420 may prompt workstation 402 to issue a request for malware cleaning 422 to server 406. In one embodiment, request 422 may be a DNS request. Other types of requests may be used as desired. In one embodiment, response 420 may provide information to be presented as part of request 422 to server 406 to identify the specific malware cleaning response desired. In this manner, server 404 may provide diagnostic functions (e.g. identifying the detected malware and determining the appropriate malware cleaning) while delegating the provision of malware cleaning to server 406. Accordingly, the diagnostic and provisioning tasks can be segregated between different network devices in order to most efficiently provide malware cleaning using cloud technology. Because request 422 may include information identifying the specific malware cleaning response desired, server 406 might simply reply with the requested malware cleaning response 424. In one embodiment, response 420 may provide a key to be presented to server 406 as part of request 422. In this manner, server 406 may authenticate request 422 as a legitimate request. Other authentication techniques may also be utilized. While FIG. 4 depicts only one server 404 and one server 406, it should be noted that multiple servers 404 and 406 may be connected to network 426. In one embodiment, response 420 may refer workstation 402 to a specific server 406 expected to have a most desirable connection to workstation 402 via network 426. In another embodiment, each of the servers 406 may be utilized to provide malware cleaning for one or more specific threats such that for a detection of one type of malware response 420 might refer workstation 402 to a particular server 406 and for a detection of a different type of malware response 420 might refer workstation 402 to a different server 406.

It will be understood by one of ordinary skill in the art that each of the network communications depicted in FIG. 4 (i.e. 418, 420, 422, and 424) as well as those described but not specifically depicted may utilize a number of transport protocols including but not limited to transmission control protocol (TCP), user datagram protocol (UDP), and stream control transmission protocol (SCTP). It will also be understood that various measures may be taken to ensure secure and reliable communications such as data encryption, message authentication, etc.

Figure 5:
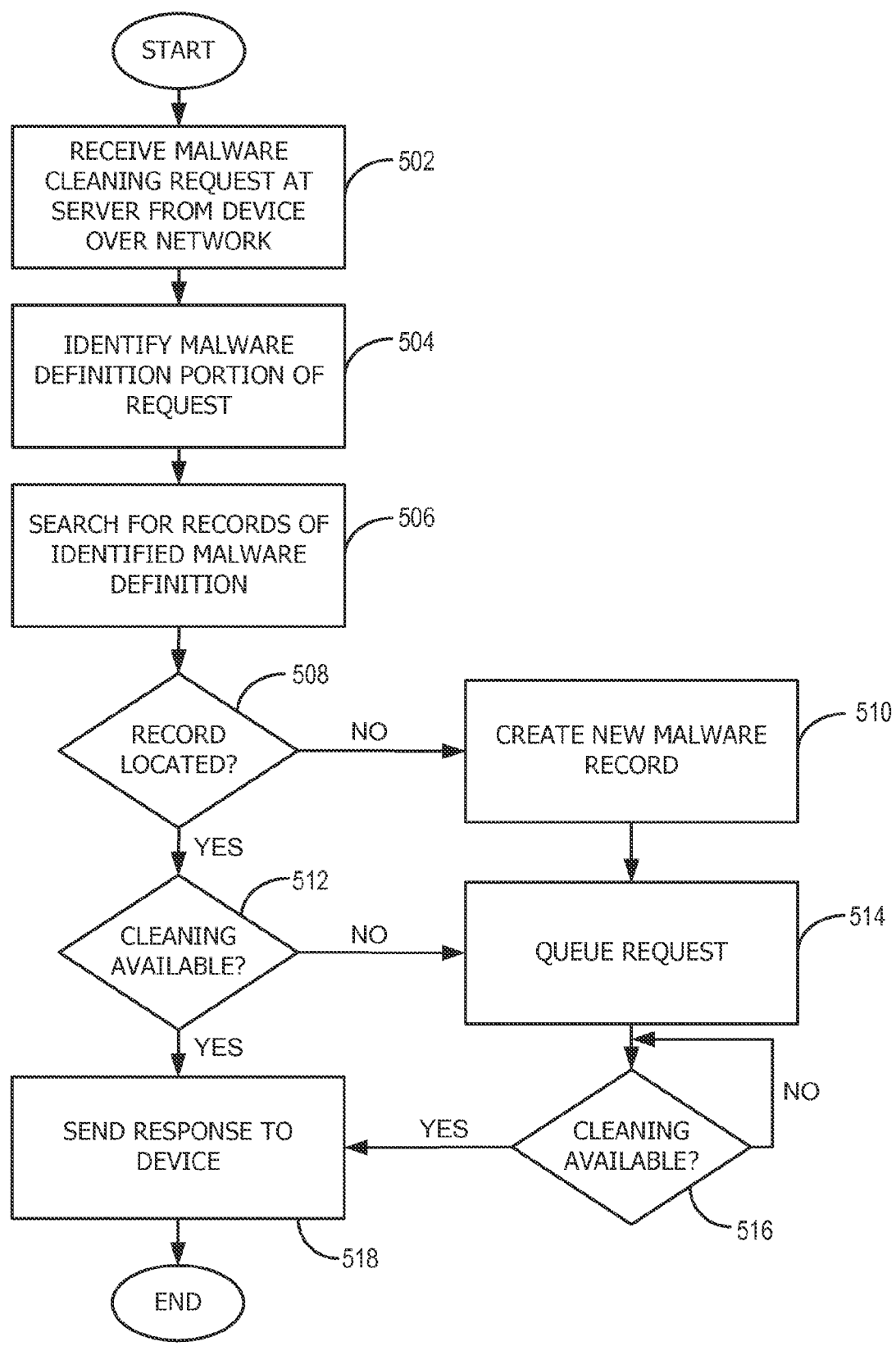
FIG. 5 is a flowchart illustrating a process for receiving and processing a request for dynamic malware cleaning using cloud technology according to one embodiment.

Referring to FIG. 5, in one embodiment a process for receiving and processing a request for dynamic malware cleaning using cloud technology begins with the receipt of a malware cleaning request 418 at a server 404 from a device 402 over a network 426 at 502. While the receiving device is described as a server, it will be understood that the receiving device may be any network device capable of receiving the malware cleaning request and processing the request as described below. In one embodiment, the network 426 may be the Internet, however, the network 426 may be any communications network capable of facilitating communications between the device 402 and the server 404 such as, for example, any of the networks discussed above in FIG. 1. In one embodiment, the request 418 may be received by a server 404 affiliated with the provider of an antivirus application installed on the device. In one embodiment, the request 418 may be a DNS request. The request 418 may identify a specific type of malware detected on the device. However, the request 418 may contain any information capable of allowing the receiving device 404 to identify an appropriate cleaning response associated with the detected malware.

At step 504, the server 404 identifies the malware definition portion of the request 418. The malware definition portion of the request 418 may identify a specific type of malware detected on the device 402 in order to allow the server 404 to identify an appropriate cleaning response 420 associated with the detected malware. In one embodiment, identifying the malware definition portion of the request 418 may include decrypting the request 418 from the device 402. In another embodiment, identifying the malware definition portion of the request 418 may include parsing the request. For example, the request 418 may include version and licensing information associated with an antivirus application installed on the device 402, geographical and/or network location of the device 402, etc., that may be separated from the malware definition portion of the request 418.

Having located the malware definition portion of the request 418, the server 404 can search for records matching the identified malware definition at 506. In one embodiment, the server 404 may perform a database lookup in a data store 428 associating known malware threats with corresponding cleaning responses to retrieve a record matching the particular malware definition identified in the request 418. In another embodiment, if the malware definition portion of the request 418 contains a hash of a file detected as malware, the hash may be used to search a data store 428 of file hashes representing known malware and corresponding malware cleaning responses 420.

If no matching record for the particular malware definition is located at 508, a new malware record corresponding to the particular malware definition may be created at 510. In one embodiment, the malware definition may be added to the data store 428 described above. The new malware record may incorporate additional information pertaining to the request 418 that included the malware definition. For example, the malware record may provide information regarding the device that initiated the request 418 received by the server 404, such as system information of the device 402, location of the device 402, etc. In one embodiment, the creation of the new malware record may provide an alert that a new malware threat has been observed. For example, the alert may be provided to one or more persons associated with a provider of the antivirus application. Such an alert may initiate the process for determining an appropriate cleaning response 420 for the newly observed malware.

If a record matching the malware definition portion of the request is located at 508, it is determined if an available cleaning response 420 is associated with the located record at 512. In one embodiment, it may be determined that a cleaning response 420 exists if a cleaning field associated with a data store 428 in which the located record exists is not null. If a cleaning response 420 is determined not to be available at 512, for example if a malware definition matching the malware definition of the request 418 has been previously recorded but an appropriate cleaning response 420 has not yet been determined, or if a new malware record has been created at 510, the request may be queued at 514. The request may be held until an appropriate cleaning response 420 to combat the malware is determined. In one embodiment, the server may send an indication to the device that a cleaning response 420 will be provided when it is available. In response to the queued request, the server may continue to monitor the record matching the malware definition to determine if a cleaning response 420 is available. In one embodiment, when a cleaning response 420 is available for the malware associated with the request 418, the record of the data store 428 matching the malware definition may be updated to include the appropriate cleaning response 420 in a cleaning field of the record.

When a cleaning response 420 is available at either 512 or 516, the cleaning response 420 to the request 418 is sent to the device at 518. As described above, the response 420 may utilize any desirable network protocol capable of delivering the cleaning response 420 to the device. The cleaning response may take the form of any of the responses described above. For that matter, the response 420 may take any form capable of providing malware cleaning over the network.

While the preceding disclosure has referred to certain embodiments including various functions performed by an antivirus application installed on a local device, it will be noted that the core functionality of an antivirus application may be virtually totally implemented utilizing cloud technology. Utilizing the disclosed techniques, antivirus applications may implement cloud technology for both the detection of malware threats and provision of cleaning. For example, an antivirus application installed on a device may perform only the limited functionality of prompting the device to request malware detection and cleaning using cloud technology. Such a system may be desirable to reduce the effectiveness of attacks that seek to disable the functions of an antivirus application on a device, improve device performance by reducing processing usage by antivirus applications, and reduce or eliminate costs associated with the provision of frequent software updates associated with antivirus applications.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory computer-readable medium on which are stored instructions, comprising instructions that when executed cause a programmable device to:
   detect a potential malware on a programmable device connected to a network;
   send over the network a request from the programmable device for a cleaning response corresponding to the potential malware; and
   receive the cleaning response over the network responsive to the request,
   wherein the received cleaning response comprises one or more of:
      instructions to execute cleaning routines previously stored on the programmable device;
      cleaning routines to be executed by the programmable device; and
      instructions to obtain the cleaning response from another device, and
   wherein the cleaning routines comprise instructions that when executed by the programmable device cause the programmable device to remove the detected potential malware.

2. The non-transitory computer-readable medium of claim 1, wherein the instructions further comprise instructions that when executed cause the programmable device to determine that cleaning procedures corresponding to the detected potential malware are not determinable at the programmable device prior to sending the request.

3. The non-transitory computer-readable medium of claim 2, wherein the instructions that when executed cause the programmable device to determine that cleaning procedures corresponding to the detected potential malware are not determinable at the programmable device comprises:
   determine that existing cleaning procedures are unacceptable.

4. The non-transitory computer-readable medium of claim 1, wherein the instructions that when executed cause the programmable device to detect a potential malware on the programmable device comprise instructions that when executed cause the programmable device to perform a heuristic based analysis of a file of the programmable device.

5. The non-transitory computer-readable medium of claim 1, wherein the request is a domain name system query.

6. The non-transitory computer-readable medium of claim 1, wherein the request is encrypted.

7. The non-transitory computer-readable medium of claim 1, wherein the request includes a hash of a file representing the potential malware.

8. The non-transitory computer-readable medium of claim 1, wherein the request includes authentication information.

9. The non-transitory computer-readable medium of claim 1, wherein the instructions further comprise instructions that when executed cause the programmable device to receive the cleaning response from the another device over the network.

10. A system, comprising:
    a storage device, and
    a processor operatively coupled to the storage device, the processor adapted to execute instructions stored in the storage device, the instructions comprising instructions that when executed cause the processor to:
    receive a request from a client over the network, the request from the client containing information pertaining to the detected potential malware on the client;
    determine a cleaning response; and
    send the cleaning response to the client over the network responsive to the request,
    wherein the cleaning response sent to the client comprises one or more of:
       instructions to execute cleaning routines previously stored on the client;
       cleaning routines to be executed by the client; and
       instructions to obtain a cleaning response from another device, and
    wherein the cleaning routines comprise instructions that when executed by the client cause the client to remove the detected potential malware.

11. The system of claim 10, wherein the request is a domain name system query.

12. The system of claim 10, wherein the act of determining the cleaning response comprises searching a data store of the server for information corresponding to the detected potential malware.

13. The system of claim 10, wherein the cleaning response is encrypted.

14. A non-transitory computer-readable medium for providing malware cleaning, on which is stored instructions comprising instructions that when executed cause a programmable device to:
- receive a malware cleaning request over a network;
- identify a malware definition portion of the malware cleaning request;
- search a data store for information corresponding to the identified malware definition portion;
- send a cleaning response, responsive to the malware cleaning request, over the network, the cleaning response determined from the information,
- wherein the cleaning response comprises one or more of:
  - instructions to execute previously stored cleaning;
  - cleaning routines to be executed; and
  - instructions to obtain a cleaning response from another device, and
- wherein the cleaning routines comprise instructions that when executed cause the removal of the detected potential malware.

15. The non-transitory computer-readable medium of claim 14, wherein the instructions that when executed cause the programmable device to identify a malware definition portion of the malware cleaning request comprise instructions that when executed cause the programmable device to parse the malware cleaning request.

16. A method, comprising:
- detecting potential malware on a programmable device connected to a network;
- sending over the network a request for a cleaning response; and
- receiving over the network the cleaning response,
- wherein the received cleaning response comprises one or more of:
  - instructions to execute cleaning routines previously stored on the programmable device;
  - cleaning routines to be executed by the programmable device; and
  - instructions to obtain a cleaning response from another device, and
- executing the cleaning routines to remove the detected potential malware.

* * * * *

UNITED STATES PATENT AND TRADEMARK OFFICE
CERTIFICATE OF CORRECTION

PATENT NO.         : 8,677,493 B2                                  Page 1 of 1
APPLICATION NO.    : 13/227407
DATED              : March 18, 2014
INVENTOR(S)        : Singh et al.

It is certified that error appears in the above-identified patent and that said Letters Patent is hereby corrected as shown below:

In the Specification

In column 4, lines 51-52, delete "repair malware and remove its effects" and insert --remove malware and repair its effects--.

In column 8, line 42, delete "workstation 404" and insert --workstation 402--.

In column 8, line 46, delete "workstation 404" and insert --workstation 402--.

Signed and Sealed this
Seventeenth Day of June, 2014

Michelle K. Lee
*Deputy Director of the United States Patent and Trademark Office*